Figures 1, 2:
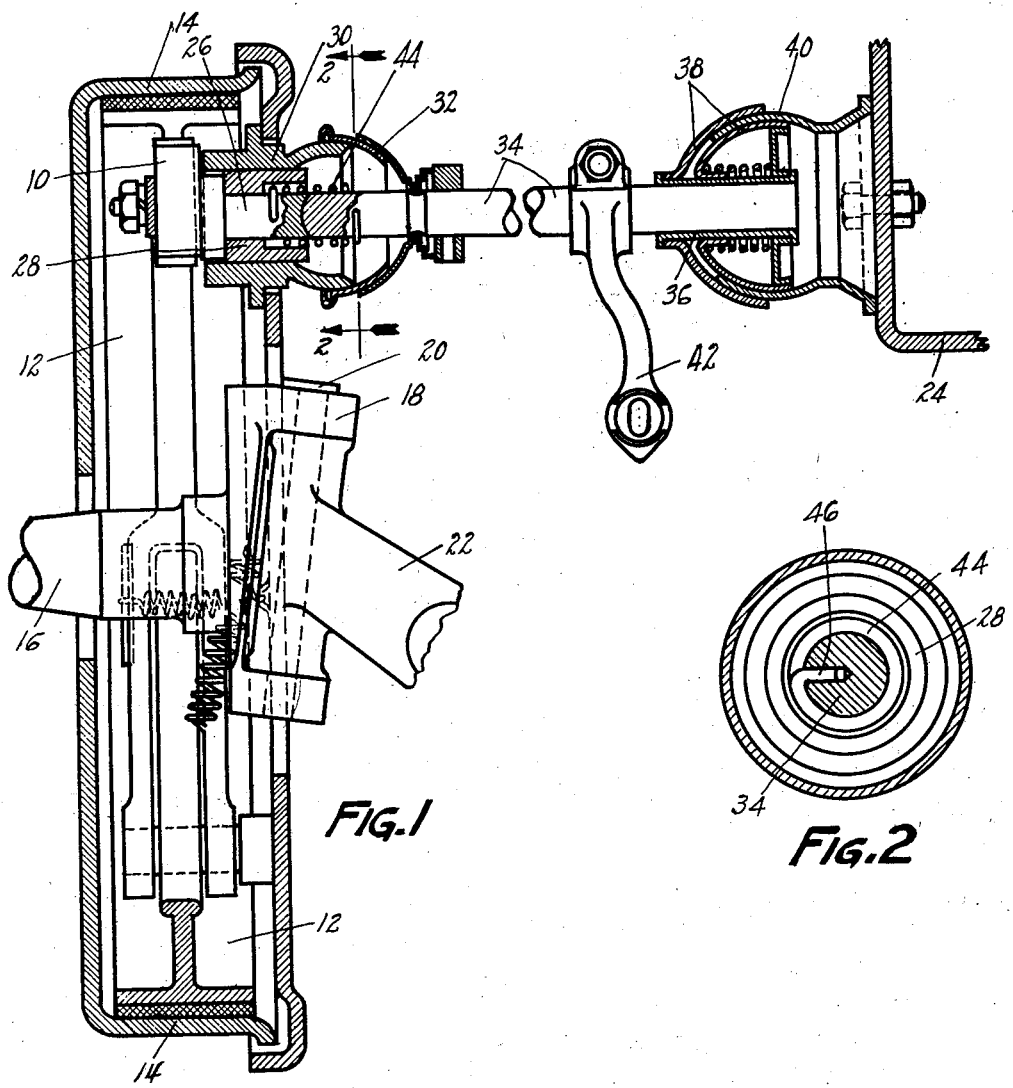

May 4, 1926.

R. S. SANFORD

BRAKE OPERATING MECHANISM

Filed Nov. 2, 1925

1,583,185

INVENTOR
ROY S. SANFORD
BY
*m. W. McConkey*
ATTORNEY

Patented May 4, 1926.

1,583,185

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed November 2, 1925. Serial No. 66,273.

*To all whom it may concern:*

Be it known that I, ROY S. SANFORD, a citizen of the United States, residing in South Bend, in the county of St. Joseph and State of Indiana, have invented a certain new and useful Improvement in Brake-Operating Mechanism, of which the following is a specification.

This invention relates to brakes, and is illustrated as embodied in mechanism operating a front wheel automobile brake. An object of the invention is to simplify mechanism of this general character, reducing the cost and partially eliminating the need of lubrication, by substituting a novel torque-transmitting element for the usual universal joint.

In one desirable arrangement, a helical torque-transmitting element, shown as a torsion spring, is connected to the adjacent ends of swivelling and non-swivelling shaft sections, preferably being sleeved upon the ends of those sections. I prefer to support the inner end of the non-swivelling shaft section movably on the chassis frame.

In the arrangement shown in the drawing, this torque-transmitting element is arranged to be wrapped more tightly about the shaft sections in applying the brake, and the shaft sections engage each other in a ball-and-socket joint. The spring connecting the sections may be tensioned to urge the sections toward each other to hold this joint together.

The above and other objects and features of the invention, including various novel combinations of parts and desirable particular constructions, will be apparent from one illustrative embodiment shown in the accompanying drawing, in which:

Fig. 1 is a vertical transverse section through a front brake, and through associated parts; and Fig. 2 is a vertical section through one shaft section on the line 2—2 of Fig. 1, showing the connection of the spring to said section.

In the arrangement illustrated, the mechanism is intended to operate a cam 10 or the like forcing friction means such as shoes 12 against a brake drum 14 rotating with a wheel (not shown) on the spindle 16 of a knuckle 18 swivelled by a king pin 20 to an axle 22. Axle 22, with a rear axle, supports a chassis frame 24 by means of the usual springs (not shown). Except as further described below, the above-identified parts or their equivalents may be of any desired construction.

Arranged to operate cam 10 or its equivalent is a short shaft section 26 journalled in a bushing 28 in a bracket 30 extended about the end of section 26 to form part of a universal housing 32. Section 26 is concave at its end, to form a socket receiving the ball end of the non-swivelling shaft section 34, thus forming a ball-and-socket joint approximately in the swivelling axis, i. e., approximately in the axis of king pin 20. The inner end of section 34 is movably supported by being slidably received in a sleeve 36 universally supported by inner and outer hemispherical shells 38 slidably engaging a hemispherical bracket 40 carried by frame 24. Section 34 is rocked to apply the brake by a tension element operated by the pedal, or other operating means, and connected to arm 42 on said section.

Sections 26 and 34 are connected by a novel torque-transmitting element, shown as a helical torsion spring 44 sleeved on the adjacent ends and connected at its opposite ends to the respective sections, for example by having its ends 46 (Fig. 2) turned radially inward and inserted into radial sockets in the shaft sections. I prefer to tension spring 44 axially, to urge sections 26 and 34 toward each other to hold the joint between them tight, and I also prefer to wrap spring 44 in such a direction that it is tightened on the shaft sections by rocking section 34 in a direction to apply the brake, although if it be desired to apply the brake yieldingly the spring will be wrapped in the opposite direction.

While one illustrative embodiment has been described in detail, it is not my intention to limit the scope of the invention to that particular embodiment, or otherwise than by the terms of the appended claims.

I claim:

1. Brake-operating mechanism for a brake on a swivelled wheel comprising, in combination, swivelling and non-swivelling shaft sections approximately in alinement with each other when the wheel is directed straight ahead and with the joint between them approximately at the swivelling axis of the wheel, and a spring connecting said sections and permitting the swivelling of the wheel and serving as a torque-transmitting element between said sections in all positions of the wheel.

2. Brake-operating mechanism for a brake on a swivelled wheel comprising, in combination, swivelling and non-swivelling shaft sections approximately in alinement with each other when the wheel is directed straight ahead and with the joint between them approximately at the swivelling axis of the wheel, and a helical torque-transmitting element sleeved on the adjacent ends of said sections and connecting said sections and permitting the swivelling of the wheel.

3. Brake-operating mechanism for a brake on a swivelled wheel comprising, in combination, swivelling and non-swivelling shaft sections approximately in alinement with each other when the wheel is directed straight ahead and with the joint between them approximately at the swivelling axis of the wheel, and a spring connecting said sections and permitting the swivelling of the wheel and serving as a torque-transmitting element between said sections in all positions of the wheel, the adjacent ends of the sections being respectively concave and convex and forming a ball and socket joint.

4. Brake-operating mechanism for a brake on a swivelled wheel comprising, in combination, swivelling and non-swivelling shaft sections approximately in alinement with each other when the wheel is directed straight ahead and with the joint between them approximately at the swivelling axis of the wheel, and a spring connecting said sections and permitting the swivelling of the wheel and serving as a torque-transmitting element between said sections in all positions of the wheel, the adjacent ends of the sections being respectively concave and convex and forming a ball-and-socket joint, and said spring being tensioned to urge the sections together to hold the joint assembled.

5. Brake-operating mechanism for a brake on a swivelled wheel comprising, in combination, swivelling and non-swivelling shaft sections approximately in alinement with each other when the wheel is directed straight ahead and with the joint between them approximately at the swivelling axis of the wheel, and a spring connecting said sections and permitting the swivelling of the wheel and serving as a torque-transmitting element between said sections in all positions of the wheel, the adjacent ends of the sections being respectively concave and convex and forming a ball and socket joint.

6. Brake-operating mechanism for a brake on a swivelled wheel comprising, in combination, swivelling and non-swivelling shaft sections approximately in alinement with each other when the wheel is directed straight ahead and with the joint between them approximately at the swivelling axis of the wheel, and a spring connecting said sections and permitting the swivelling of the wheel and serving as a torque-transmitting element between said sections in all positions of the wheel, the adjacent ends of the sections being respectively concave and convex and forming a ball and socket joint, the adjacent ends of the sections being respectively concave and convex and forming a ball and socket joint, and said element comprising a spring tensioned to urge the sections together to hold the joint assembled.

7. Operating mechanism for a brake on a swivelled wheel comprising, in combination, swivelling and non-swivelling shaft sections arranged end to end with the joint between them approximately at the swivelling axis, and a helical torsion element sleeved on the adjacent ends of the sections and secured at its ends to said sections respectively.

8. Operating mechanism for a brake on a swivelled wheel comprising, in combination, swivelling and non-swivelling shaft sections arranged end to end with the joint between them approximately at the swivelling axis, and a helical torsion element sleeved on the adjacent ends of the sections and secured at its ends to said sections respectively, the element being so arranged that rocking the non-swivelling section in a direction to apply the brake causes the element to wrap more tightly about the shaft sections.

9. Operating mechanism for a brake on a swivelled wheel comprising, in combination, swivelling and non-swivelling shaft sections arranged end to end with a ball-and-socket joint between them approximately at the swivelling axis, and a helical torsion element sleeved on the adjacent ends of the sections and embracing said joint and secured at its ends to said sections respectively.

10. Operating mechanism for a brake on a swivelled wheel comprising, in combination, swivelling and non-swivelling shaft sections arranged end to end with the joint between them approximately at the swivelling axis, and a helical torsion element sleeved on the adjacent ends of the sections and secured at its ends to said sections respectively, the torsion element comprising a spring tensioned axially to urge the shaft sections toward each other.

11. Operating mechanism for a brake on a swivelled wheel comprising, in combination, swivelling and non-swivelling shaft sections arranged end to end with a ball-and-socket joint between them approximately at the swivelling axis, and a helical torsion element sleeved on the adjacent ends of the sections and embracing said joint and secured at its ends to said sections respectively, the torsion element comprising a spring tensioned axially to urge the shaft sections toward each other.

12. Operating mechanism for a brake on a swivelled wheel supporting a chassis frame, comprising, in combination, a shaft section supported by and swivelling with the wheel, a shaft section movably supported at its inner end by the chassis frame, the two sections being arranged end to end with the joint between them approximately in the swivelling axis of the wheel, and a spring connecting the two sections and serving as a torque-transmitting means from the second to the first section.

13. Operating mechanism for a brake on a swivelled wheel supporting a chassis frame, comprising, in combination, a shaft section supported by and swivelling with the wheel, a shaft section movably supported at its inner end by the chassis frame, the two sections being arranged end to end with a ball-and-socket joint between them approximately in the swivelling axis of the wheel, and a spring connecting the two sections and serving as a torque-transmitting means from the second to the first section.

14. Operating mechanism for a brake on a swivelled wheel supporting a chassis frame, comprising, in combination, a shaft section supported by and swivelling with the wheel, a shaft section movably supported at its inner end by the chassis frame, the two sections being arranged end to end with the joint between them approximately in the swivelling axis of the wheel, and a helical torque transmitting element sleeved upon the adjacent shaft ends and connected at its opposite ends to the respective sections.

15. Operating mechanism for a brake for a wheel supporting a chassis frame, comprising, in combination, a wheel-supported shaft section, a shaft section supported movably at its inner end on the chassis frame, the sections being arranged end to end, and a spring connected to both of the sections and serving as a torque-transmitting element between them.

16. Operating mechanism for a brake for a wheel supporting a chassis frame, comprising, in combination, a wheel-supported shaft section, a shaft section supported movably at its inner end on the chassis frame, the sections being arranged end to end, and a helical torque-transmitting element sleeved on the adjacent ends of said sections and connected at its opposite ends of the respective sections.

17. Operating mechanism for a brake for a wheel supporting a chassis frame, comprising, in combination, a wheel-supported shaft section, a shaft section supported movably at its inner end on the chassis frame, the sections being arranged end to end, and a helical torque-transmitting element sleeved on the adjacent ends of said sections and connected at its opposite ends to the respective sections, said element being so arranged that applying the brake winds it more tightly on the sections.

18. Operating mechanism for a brake for a wheel supporting a chassis frame, comprising, in combination, a wheel-supported shaft section, a shaft section supported movably at its inner end on the chassis frame, the sections being arranged end to end with a ball-and-socket joint between them, and a spring connecting the sections and serving as a torque-transmitting element between them and also urging the sections toward each other.

19. Operating mechanism for a brake for a wheel supporting a chassis frame, comprising, in combination, a wheel-supported shaft section, a shaft section movably supported at its inner end by the chassis frame, the sections being arranged end to end, and a helical spring sleeved on the adjacent ends of the shaft sections and connected at its opposite ends to the respective sections.

20. Operating mechanism for a brake for a wheel supporting a chassis frame, comprising, in combination, a wheel-supported shaft section, a shaft section movably supported at its inner end by the chassis frame, the sections being arranged end to end, and a helical spring sleeved on the adjacent ends of the shaft sections and connected at its opposite ends to the respective sections and tensioned to urge the shaft sections axially toward each other.

In testimony whereof, I have hereunto signed my name.

ROY S. SANFORD.